(12) United States Patent
Xu

(10) Patent No.: US 8,156,672 B2
(45) Date of Patent: Apr. 17, 2012

(54) STORMPROOF BILLBOARD AND CONTROL METHOD THEREOF

(76) Inventor: Peiyuan Xu, Ningbo (CN)

( * ) Notice: Subject to any disclaimer, the term of this patent is extended or adjusted under 35 U.S.C. 154(b) by 240 days.

(21) Appl. No.: 12/509,440

(22) Filed: Jul. 25, 2009

(65) Prior Publication Data

US 2010/0018098 A1    Jan. 28, 2010

(30) Foreign Application Priority Data

Jul. 25, 2008  (CN) .......................... 2008 1 0063715

(51) Int. Cl.
*G09F 15/00* (2006.01)
(52) U.S. Cl. ................... 40/624; 40/602; 40/473
(58) Field of Classification Search ............. 40/473, 40/493, 602, 624; 290/44; 477/29; 416/10
See application file for complete search history.

(56) References Cited

U.S. PATENT DOCUMENTS

| | | | |
|---|---|---|---|
| 2,800,734 A * | 7/1957 | Blackburn | 40/602 |
| RE28,549 E * | 9/1975 | Bevan | 40/473 |
| 6,571,495 B1 * | 6/2003 | Margaronis | 40/473 |
| 6,739,725 B2 * | 5/2004 | Ben-Ari | 353/28 |
| 6,775,938 B2 * | 8/2004 | Lanci | 40/747 |
| 7,685,754 B1 * | 3/2010 | Torres | 40/606.14 |
| 2010/0054939 A1 * | 3/2010 | Hoffmann | 416/10 |

* cited by examiner

*Primary Examiner* — Joanne Silbermann
*Assistant Examiner* — Christopher e Veraa

(57) ABSTRACT

The present invention relates to an stormproof billboard and control method thereof, which includes a column, a billboard stent, a rotating element, a motor, an electromagnetic brake, an anemoscope, a trigger switch, and an electric control assembly, wherein the control element respectively connects with the electromagnetic brake, the motor and the trigger switch, the electric control assembly controls the work of the motor and the electromagnetic brake by the wind speed signal measured by the anemoscope and the signal of the trigger switch. By using above structure, the invention can change the windward section of the stormproof billboard by the wind speed and the wind direction, such that effectively reduces the wind load, makes the stormproof billboard more secure in use. The invention is easy to control and secure to use, makes the advertisement have a good effect, it is worth to use the stormproof billboard.

18 Claims, 11 Drawing Sheets

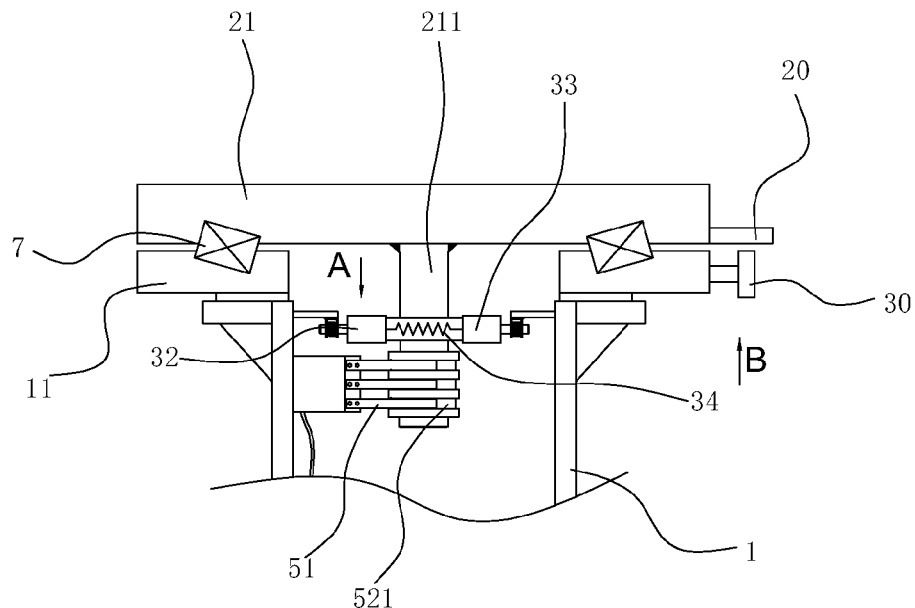
Fig.2
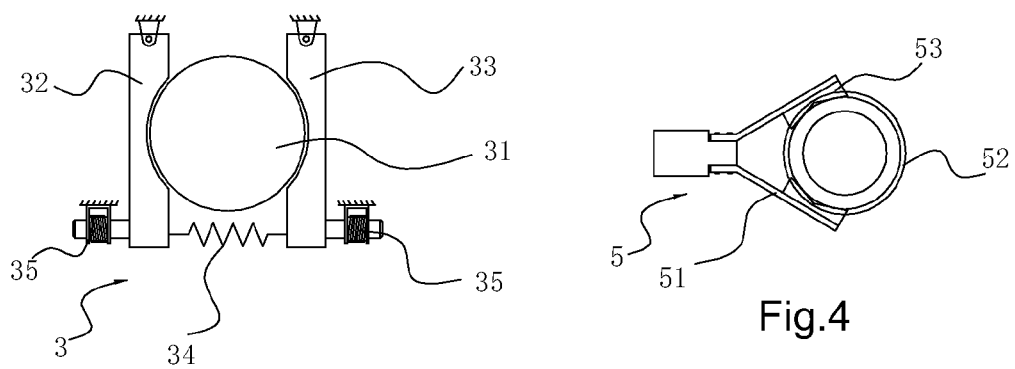
Fig.3
Fig.4
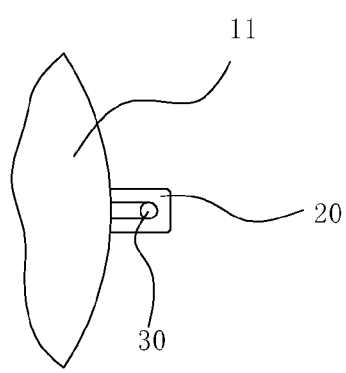
Fig.5

STORMPROOF BILLBOARD AND CONTROL METHOD THEREOF

BACKGROUND OF THE PRESENT INVENTION

1. Field of Invention

The present invention relates to a billboard and control method thereof, and more particularly to a large stormproof billboard and control method thereof.

2. Description of Related Arts

Billboards are used as devices to transmit advertising information to the public, and according to different needs, the billboards can be made into various forms. Among that the large billboards which are established on transport corridors, transport hubs and so on are more common, the billboard stents of the billboards are usually supported on single column or multiple columns, and according to the billboard face, the billboards can be divided into single-faced, double-faced and multiple-faced. Because such billboards have simple structure, easy production process and can attract the attention of passers, the billboards are widely used. However, in actual use, it is found that: because the billboard stents fixed with the column and the billboard face to the public, the billboards can not change windward side with the wind direction after the billboards are set, so that the billboard may be damaged or fall down in bad weather, which does not only bring unnecessary loss to the advertisers and manufacturers, but also brings great security risk to the pedestrians. In order to eliminate such defects, it is tended to increase the size of the column, improve the material of the billboard stent and so on to meet the wind load in windy weather, but this program will obviously increase the manufacture cost of billboard.

Therefore, people design a stormproof billboard, such as a roadside stormproof billboard, according to Chinese patent, Publication No. CN2760701Y, this patent discloses that: an eccentric column is formed by a column and a billboard panel, the billboard panel connects with the column by a shaft lining so as to rotate with respect to each other, a turn restoration assembly is fixed with the billboard panel, the turn restoration assembly comprises two restoring springs symmetrically disposed on two sides of a support shore, two ends of each restoring spring respectively contact with a movable plate and a mounting plate, the top of the support shore fixed with a rotary block held between the two movable plates, two ends of the rotary block are cone. In use, under the wind force, the billboard panel rotates with respect to the column, drives rotary block and compresses the restoring springs to form a torque. When the wind force is reducing, under the force of the restoring springs, the billboard panel is reset, and the torque is released. Clearly, using such billboards can overcome the disadvantage of the conventional billboard to a certain extent. However, after analysing the structure carefully, it is found that: because the billboard panel always rotates with respect to the column and the billboard panel is located on a higher position, even if there is slightest wind, the billboard will rotate, namely, the billboard will deviate from the best direction; when the wind force is reducing, because the billboard panel is heavy, the restoring speed of the billboard panel is slow with only two springs, and when the wind direction changes in a larger scope, the billboard panel has a dead center and therefore can not complete the wide-angle turn. Therefore, in the use of the billboard panel, the billboard can not be in the best direction so that the advertising effectiveness is affected.

And as to an unloading method of the wind load on a billboard and an anti-wind billboard, according to Chinese patent, Publication No. CN100390838C, this patent discloses a control method of the billboard, which uses a wind speed sensor to measure real-time wind speed, an anemoscope translates the wind speed into an electronic control signal, a comparison circuit of the anemoscope compares the electronic control signal with a predetermined control parameter, a motor is controlled by a relay; the motor drives laminas of the louver style billboard panel to adjust an angle by a reduction device and a transmission mechanism. By using the above structure, the windward side of the billboard can be changed to a certain extent for unloading the wind load of the billboard. However, the billboard also has the following shortcoming: first, in control, the control system of the control method simply monitors the real-time wind speed, when the wind speed is greater than the security value and the wind direction is in parallel with the billboard, the system still sends the rotation signal to the laminas of the billboard, but this is unnecessary; and in the process of adjusting laminas angle, because the rigid mechanical drive always exists, the wind load is always transferred to the billboard stent. In bad weather, the wind speed is very unstable, in the process of adjusting laminas, if the wind speed increases instantaneously, the system can not make the corresponding adjustment, the billboard may be damaged by wind. Second, for the mechanical part, because of the louver structure, the movable parts are complex; and because the billboard panel is not a whole, advertise image must be sprayed or consists of plural screens, which makes the image effect bad, maintenance and replacement is also very troublesome.

SUMMARY OF THE PRESENT INVENTION

A main object of the present invention is to provide a stormproof billboard, which can change the windward section of the stormproof billboard by the wind speed, unload the wind load, and reset quickly.

Another object of the present invention is to provide a control method of the stormproof billboard, which can change the windward section of the stormproof billboard by the wind speed, unload the wind load, reset quickly, and make the windward section change in time in the process of resetting.

Another object of the present invention is to provide a control method of the stormproof billboard, which can change the windward section of the stormproof billboard by the wind speed and the wind direction, unload the wind load, reset quickly, and make the windward section change in time in the process of resetting.

Accordingly, in order to accomplish the above object, the present invention provides a stormproof billboard, comprising:

a column, wherein a pedestal is disposed on a top of the column;

a billboard stent, wherein a rotating table is fixed on the billboard stent and corresponding to the pedestal;

a rotating element disposed between the rotating table and the pedestal so as to make the rotating table rotate with respect to the pedestal;

a motor disposed on the column and driving the rotating table to rotate by a driver gear;

an electromagnetic brake disposed on the column to lock the rotating table;

an anemoscope measuring a wind speed;

a trigger switch disposed between the rotating table and the pedestal to measure that whether the rotating table aligns with the pedestal; and an electric control assembly respectively connecting with the electromagnetic brake, the motor, the anemoscope and the trigger switch, wherein the electric control assembly controls working of the motor and the electromagnetic brake by a signal of the trigger switch and a wind speed signal measured by the anemoscope.

As an improvement, the stormproof billboard further comprises a dogvane, the dogvane connects with the electric control assembly to measure an angle D-value, the angle D-value is a difference value between a billboard stent direction and a natural wind direction, and the electric control assembly controls working of the motor and the electromagnetic brake by the wind speed signal measured by the anemoscope and the signal of the trigger switch.

The rotating table comprises a rotating shaft downwards inserting into the column and disposed on the rotating table, the electromagnetic brake is disposed in the column, the electromagnetic brake comprises a braked wheel ringing on the rotating shaft, a left friction plate disposed on a left side of the braked wheel, and a right friction plate disposed on a right side of the braked wheel, wherein one end of each of the left friction plate and the right friction plate is fixed on an inside wall of the column respectively, another end of each of the left friction plate and the right friction plate is free, a spring is disposed between the two free ends, and at least an electromagnetic power unit is disposed on the free end of the left friction plate or the right friction plate. Of course, the electric control assembly can also be fixed outside the column, to brake a high speed shaft of the driver gear on demand, this embodiment can also control the rotating table to rotate.

A center current collector is disposed in the column, the center current collector comprises three electric elastic clips, and a collecting ring fixed on a tail of the rotating shaft, wherein two carbon brushes are respectively fixed on two relative ends of each elastic clip, three electric annular grooves are spacedly formed on the collecting ring and are mutually insulating, each electric annular groove of the collecting ring is clipped by the corresponding elastic clip to make the carbon brushes cling to an outside surface of the electric annular groove. Clearly, when the rotating table is rotated with the motor, an illumination wire connecting with the elastic clip does not move so as to effectively avoid damaging the illumination wire in the rotating process of the rotating table, such that a circuit is reliable turn-on when the billboard stent is rotating.

As considering to trigger a signal in time after the billboard resets, the trigger switch is disposed between the rotating table and the pedestal, here, the trigger switch consists of a block and a limit switch, wherein the block is fixed on the rotating table, the limit switch can use a conventional travel switch, also can use a dry-reed switch, photoelectric switch or inductive switch, when the rotating table is located on a predetermined position, the limit switch sends the signal to the electric control assembly so as to control the motor stalling or control the electromagnetic brake locking.

The electric control assembly comprises a control element and a signal conversion element, wherein the control element respectively connects with the electromagnetic brake, the motor and the trigger switch, the anemoscope connects with the control element by the signal conversion element, the electric control assembly controls working of the motor and the electromagnetic brake by the wind speed signal measured by the anemoscope and the signal of the trigger switch.

In order to make the billboard stent in parallel with the natural wind in shortest time, the stormproof billboard further comprises a forward relay controlling the motor to rotate forward and a backward relay controlling the motor to rotate backward.

In order to prevent the rotating element contacting with dust and prevent lubricant grease of the rotating element leaking, a sealing element is positioned on a side of the rotating element and is disposed between the pedestal and the rotating table.

In order to accomplish the above object, the present invention provides a control method of the stormproof billboard, comprising the following steps of:

(11) predetermining a first secure wind speed, a second secure wind speed which is less than the first secure wind speed, and a delay time;

(12) the electric control assembly begins to collect a first wind speed measured by the anemoscope;

(13) judging whether the first wind speed is greater than or equal to the first secure wind speed, if not, returning to the step (12); if yes, the electric control assembly sends a control signal to turn on the electromagnetic brake, such that the electromagnetic brake gets power and releases the rotating table so as to make the billboard stent rotate with the natural wind, then entering the next step;

(14) the electric control assembly begins to collect a second wind speed measured by the anemoscope;

(15) judging whether the second wind speed is greater than or equal to the first secure wind speed, if yes, returning to the step (14); if not, entering the next step;

(16) judging whether the second wind speed is less than the second secure wind speed, if not, returning to the step (14); if yes, turning on an inner timer which has been predetermined with the delay time, then entering the next step;

(17) the electric control assembly begins to collect a third wind speed measured by the anemoscope;

(18) judging whether the third wind speed is less than the second secure wind speed, if not, returning to the step (14); if yes, judging whether the timer has expired, if not, returning to the step (17), if yes, entering the next step; and

(19) judging whether the electric control assembly has received the control signal from the trigger switch, wherein the trigger switch will send the control signal to the electric control assembly when the rotating table has aligned with the pedestal, if not, the electric control assembly continues sending the control signal to turn on the electromagnetic brake and the motor, such that the electromagnetic brake continues to release the rotating table so as to make the billboard stent reset by the drive of the motor; if yes, the electric control assembly sends the control signal to make the electromagnetic brake and the motor lose power so as to make the electromagnetic brake lock the billboard stent, returning to the step (12).

In order to accomplish the above object, as an alternatively embodiment, the present invention provides a control method of the stormproof billboard, comprising the following steps of:

(21) predetermining a first secure wind speed, a second secure wind speed which is less than the first secure wind speed, a delay time, and an angle-sine translation table stored in the electric control assembly;

(22) the electric control assembly begins to collect a first wind speed measured by the anemoscope;

(23) judging whether the first wind speed is less than the second secure wind speed, if not, entering the step (26); if yes, turning on an inner timer which has been predetermined with the delay time, then entering the next step;

(24) the electric control assembly begins to collect a second wind speed measured by the anemoscope; judging whether the second wind speed is less than the second secure wind speed, if not, the electric control assembly sends the control signal to make the motor lose power, entering the step (26); if yes, judging whether the timer has expired, if not, returning to the step (24), if yes, entering the next step;

(25) judging whether the electric control assembly has received the control signal from the trigger switch, wherein the trigger switch will send the control signal to the electric control assembly when the rotating table has aligned with the pedestal, if not, the electric control assembly sends the control signal to turn on the electromagnetic brake and the motor, resetting the timer, the timer is returned to zero, and returning to the step (24); if yes, the electric control assembly sends the control signal to make the electromagnetic brake and the motor lose power so as to make the electromagnetic brake lock the rotating table, returning to the step (22);

(26) the electric control assembly begins to collect a first angle D-value measured by the dogvane, wherein the first angle D-value is a difference value between the billboard stent direction and the natural wind direction, looking up the sine value of the first angle D-value, the sine value multiplied by the wind speed is a positive wind speed which vertically forces on the billboard stent, judging whether the positive wind speed which vertically forces on the billboard stent is greater than or equal to the first secure wind speed; if yes, the electric control assembly sends the control signal to turn on the electromagnetic brake, entering the next step; if not, returning to the step (22); and

(27) the electric control assembly begins to collect a second angle D-value measured by the dogvane, wherein the second angle D-value is a difference value between the billboard stent direction and the natural wind direction, judging whether the second angle D-value is zero, if yes, the electric control assembly sends the control signal to turn off the electromagnetic brake, then returning to the step (22); if not, returning to the step (27).

In order to accomplish the above object, as an alternatively embodiment, the present invention provides a control method of the stormproof billboard, comprising the following steps of:

(31) predetermining an object wind direction scope, a plural continuous design wind direction scope which is greater than the object wind direction scope, a secure wind speed corresponding to each design wind direction scope, a maximal secure wind speed which is less than each secure wind speed, and a delay time;

(32) the electric control assembly begins to collect a first wind speed measured by the anemoscope;

(33) judging whether the first wind speed is less than the maximal secure wind speed, if not, entering the step (36); if yes, turning on an timer which has been predetermined with the delay time, then entering the next step;

(34) the electric control assembly begins to collect a second wind speed measured by the anemoscope; judging whether the second wind speed is less than the maximal secure wind speed, if not, the electric control assembly sends the control signal to make the motor lose power, entering the step (36); if yes, judging whether the timer has expired, if not, returning to the step (34), if yes, entering the next step;

(35) judging whether the trigger switch is open, namely, wherein the electric control assembly has received the control signal from the trigger switch, wherein the trigger switch will send the control signal to the electric control assembly when the rotating table has aligned with the pedestal, if not, the electric control assembly sends the control signal to turn on the electromagnetic brake, the forward relay and the backward relay, such that the electromagnetic brake gets power and releases the rotating table so as to make the billboard stent reset under the drive of the motor, resetting the timer, the timer is returned to zero, and returning to the step (34); if yes, the electric control assembly sends the control signal to make the electromagnetic brake and the motor lose power, returning to the step (32);

(36) the electric control assembly begins to collect a first angle D-value, comparing the first angle D-value with the object wind direction scope, if the first angle D-value is in the object wind direction scope, the electric control assembly sends the control signal to turn off the electromagnetic brake, such that the electromagnetic brake loses power to lock the rotating table, and returning to the step (32); and

(37) if the first angle D-value is in the design wind direction scope, the first wind speed is greater than or equal to the secure wind speed corresponding to the design wind direction scope, and the first angle D-value is in 0°~90° or 180°~270°, the electric control assembly sends the control signal to turn on the electromagnetic brake, such that the electromagnetic brake gets power and releases the rotating table, and the electric control assembly sends the control signal to turn on the forward relay, such that the billboard stent rotates along the natural wind direction by the drive of the motor, the electric control assembly goes on collecting a second angle D-value until the second angle D-value is 0° or 180°, the motor and the electromagnetic brake are turned off, returning to the step (32); if the first wind speed is greater than or equal to the secure wind speed corresponding to the design wind direction scope, and the first angle D-value is in 90°~180° or 270°~360°, the electric control assembly sends the control signal to turn on the electromagnetic brake, such that electromagnetic brake gets power and releases the rotating table, and the electric control assembly sends the control signal to turn on the backward relay, such that the billboard stent also rotates along the natural wind direction by the drive of the motor, the electric control assembly goes on collecting a second angle D-value until the second angle D-value is 0° or 180°, the motor and the electromagnetic brake are turned off, returning to the step (32).

Comparing with the related arts, the invention skillfully increases a motor and an electromagnetic brake to brake or lock the billboard stent, the stormproof billboard can change the windward section of the stormproof billboard by the wind speed measured by the anemoscope or the dogvane, unload the wind load, be used more securely, reset quickly by the motor when the real-time wind speed is less than the predetermined value in a certain time so as to make the billboard stent in the best direction, and can make the windward section change in time in the process of resetting.

These and other objectives, features, and advantages of the present invention will become apparent from the following detailed description, the accompanying drawings, and the appended claims.

BRIEF DESCRIPTION OF THE DRAWINGS

FIG. 2 is an enlarged schematic view of the stormproof billboard without the billboard stent, the motor and the driver gear, according to FIG. 1.

FIG. 3 is a structural schematic view of A direction of the electromagnetic brake according to FIG. 2.

FIG. 4 is a top view of the center current collector according to FIG. 2.

FIG. 5 is a partial structural schematic view of B direction of FIG. 2.

DETAILED DESCRIPTION OF THE PREFERRED EMBODIMENT

Figure 1:
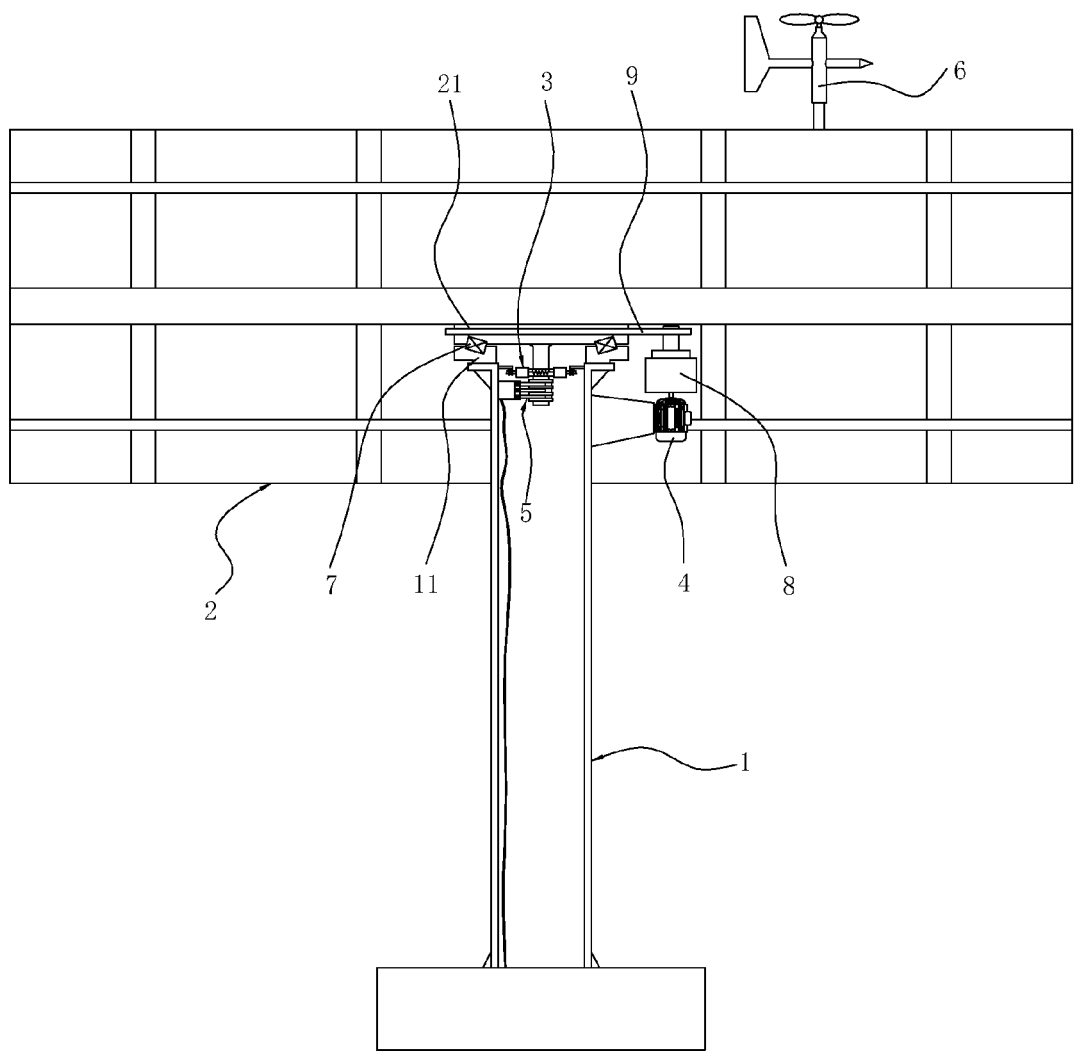
FIG. 1 is a structural schematic view of a stormproof billboard according to a first preferred embodiment of the present invention.

Further detailed description of the invention with reference to the drawings is made below.

A first preferred embodiment of the present invention illustrates a stormproof billboard and control method thereof, as shown in FIG. 1 to FIG. 5, the stormproof billboard comprises a column 1, a billboard stent 2, an electromagnetic brake 3, a motor 4, a center current collector 5, an anemoscope 6, a rotating element 7, a trigger switch and an electric control assembly.

Wherein, the column 1 uses a hollow tubular body, a bottom of the column 1 is based on the ground by foundation as usual, a pedestal 11 is fixed on a top of the column 1, in this embodiment, the pedestal 11 uses a platform structure.

The billboard stent 2 uses a conventional structure which may be symmetrical or eccentric. The stormproof billboard can be double-faced or three-faced, in this embodiment, the stormproof billboard is single-faced. A rotating table 21 corresponding to the pedestal 11 is fixed on a middle of the billboard stent 2, the rotating element 7 is disposed between the rotating table 21 and the pedestal 11, namely, the rotating element 7 is disposed between a lower surface of the rotating table 21 and an upper surface of the pedestal 11, the rotating table 21 is held by the pedestal 11. A rotating shaft 211 downwards inserting into the column 1 is disposed on the lower surface of the rotating table 21.

The electromagnetic brake 3 is disposed in the column 1, as shown in FIG. 2 and FIG. 3, the electromagnetic brake 3 comprises a braked wheel 31 ringing on the rotating shaft 211, a left friction plate 32 disposed on the left side of the braked wheel 31, and a right friction plate 33 disposed on the right side of the braked wheel 31, wherein one end of each of the left and right friction plate 32, 33 is fixed on an inside wall of the column 1 respectively. Another end of each of the left and right friction plate 32, 33 is free, and two electromagnetic power units 35 are respectively disposed on the free ends of the left and right friction plate 32, 33.

The motor 4 is fixed on an outside wall of the column 1, an output shaft of the motor 4 links with the rotating table 21 through a speed reducer 8 and a driver gear 9, wherein the speed reducer 8 uses a conventional structure, the driver gear 9 uses sprocket-chain, namely, the rotating table 21 uses a sprocket structure, such that motor 4 is capable of driving the rotating table 21 to rotate through the deceleration of the speed reducer 8 and the drive of the sprocket-chain so as to drive the billboard to rotate.

The electromagnetic brake 3 also can be mounted on the output shaft of the speed reducer 8, and therefore can also make the rotating table 21 lock or release.

The center current collector 5 is used to protect an illumination wire which is provided to the stormproof billboard, the center current collector 5 is disposed in the column 1, as shown in FIG. 1, FIG. 2 and FIG. 4, the center current collector 5 comprises three electric elastic clips 51, and a collecting ring 52 fixed on a tail of the rotating shaft 211, wherein two carbon brushes 53 are respectively fixed on two relative ends of each elastic clip 51, three electric annular grooves 521 are spacedly formed on the collecting ring 52 and are mutually insulating, each electric annular groove 521 of the collecting ring 52 is clipped by the corresponding elastic clip 51 to make the carbon brushes 53 cling to an outside surface of the electric annular groove 521. Clearly, when the rotating table 21 is rotated with the motor 4, the illumination wire connecting with the elastic clip 51 does not move so as to effectively avoid damaging the illumination wire in the rotating process of the rotating table 21, such that the circuit is reliable turn-on when the billboard stent 2 is rotating.

The anemoscope 6 can be based on the ground to monitor a real-time wind speed and sends a wind speed signal to the electric control assembly, the anemoscope 6 also can mounted on the billboard stent 2.

As considering to trigger a signal in time after the billboard resets, the trigger switch is disposed between the rotating table 21 and the pedestal 11, here, the trigger switch consists of a block 20 and a limit switch 30, as shown in FIG. 2 and FIG. 5, wherein the block 20 is fixed on the rotating table 21, the limit switch 30 can use a conventional travel switch, also can use a dry-reed switch, photoelectric switch or inductive switch, when the rotating table 21 is located on a predetermined position, the limit switch 30 sends the signal to the electric control assembly so as to control the motor 4 stalling or control the electromagnetic brake 3 locking.

Figure 6:
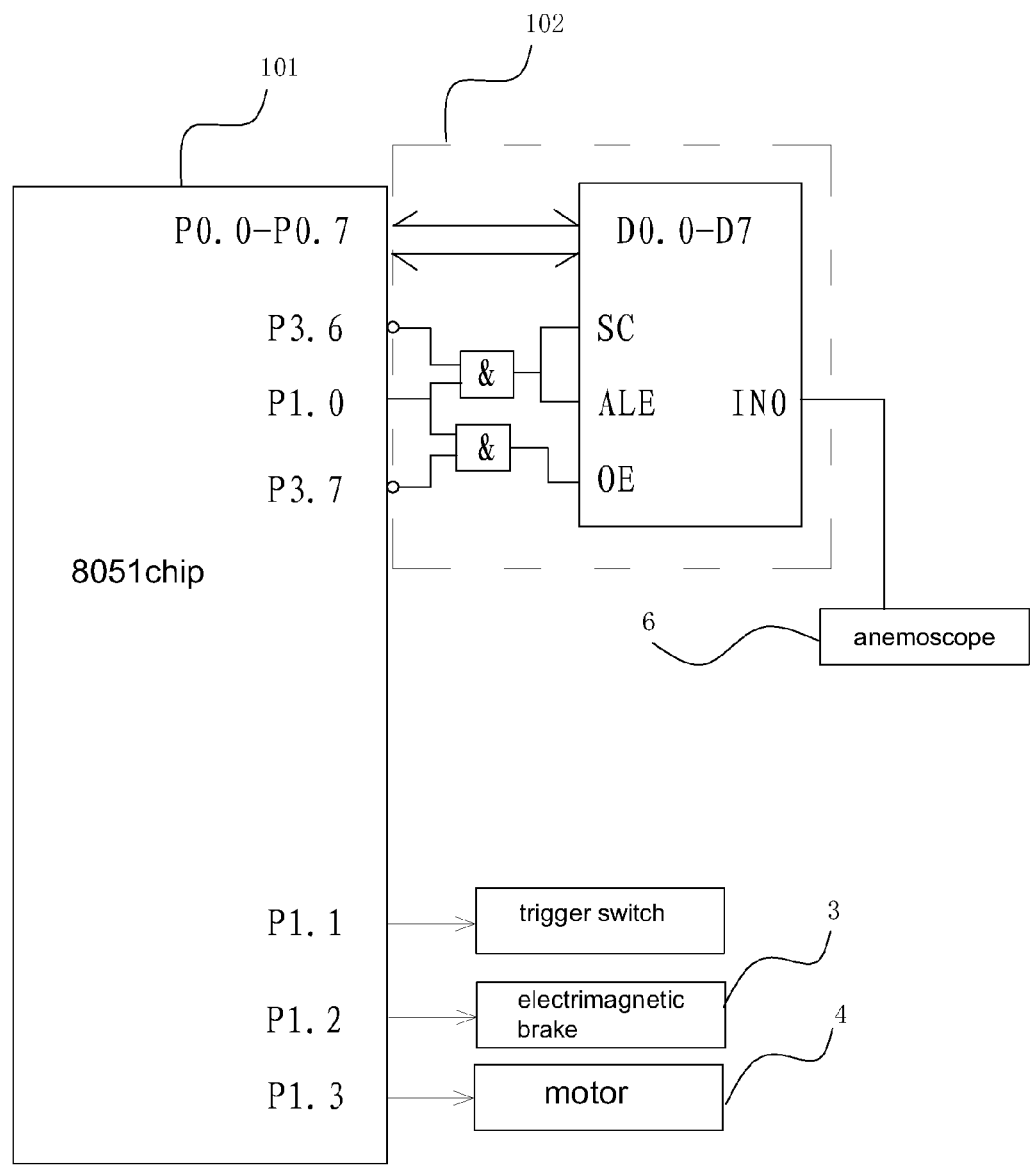
FIG. 6 is a circuit diagram of the electric control assembly according to the first preferred embodiment of the present invention.

The electric control assembly comprises a control element 101 and a signal conversion element 102, as shown in FIG. 6, wherein the control element 101 respectively connects with the electromagnetic brake 3, the motor 4 and the trigger switch, the anemoscope 6 connects with the control element 101 by the signal conversion element 102, the electric control assembly controls working of the motor 4 and the electromagnetic brake 3 by the wind speed signal measured by the anemoscope 6 and the signal of the trigger switch.

In this embodiment, the control element 101 is microprocessor chip NO. 8051, the P1.1 pin of the microprocessor chip connects with the trigger switch; the P1.2 pin of the microprocessor chip connects with an electromagnet of the electromagnetic brake 3; the P0.0-P0.7, P3.6, P1.0, P3.7 pin of the microprocessor chip connect with the signal conversion element 102.

The signal conversion element 102 consists of a convertor NO. ADC0809, a first inverter, a second inverter, a first AND gate chip, and a second AND gate chip, the anemoscope 6 connects with an IN0 input pin of the convertor, the D0.0-D0.7 pin of the convertor respectively connect with P0.0-P0.7 pin of the microprocessor chip, the P3.6 pin of microprocessor chip connects with one input port of the first AND gate chip through the first inverter, the P1.0 pin of the microprocessor chip connects with another input port of the first AND gate chip, an output port of the first AND gate chip connects with the SC, ALE pin of the convertor, the P3.7 pin of the microprocessor chip connects with one input port of the second AND gate chip through the second inverter, the P1.0 pin of the microprocessor chip connects with another input port of the second AND gate chip, an output port of the second AND gate chip connects with the OE pin of the convertor.

Figure 7:
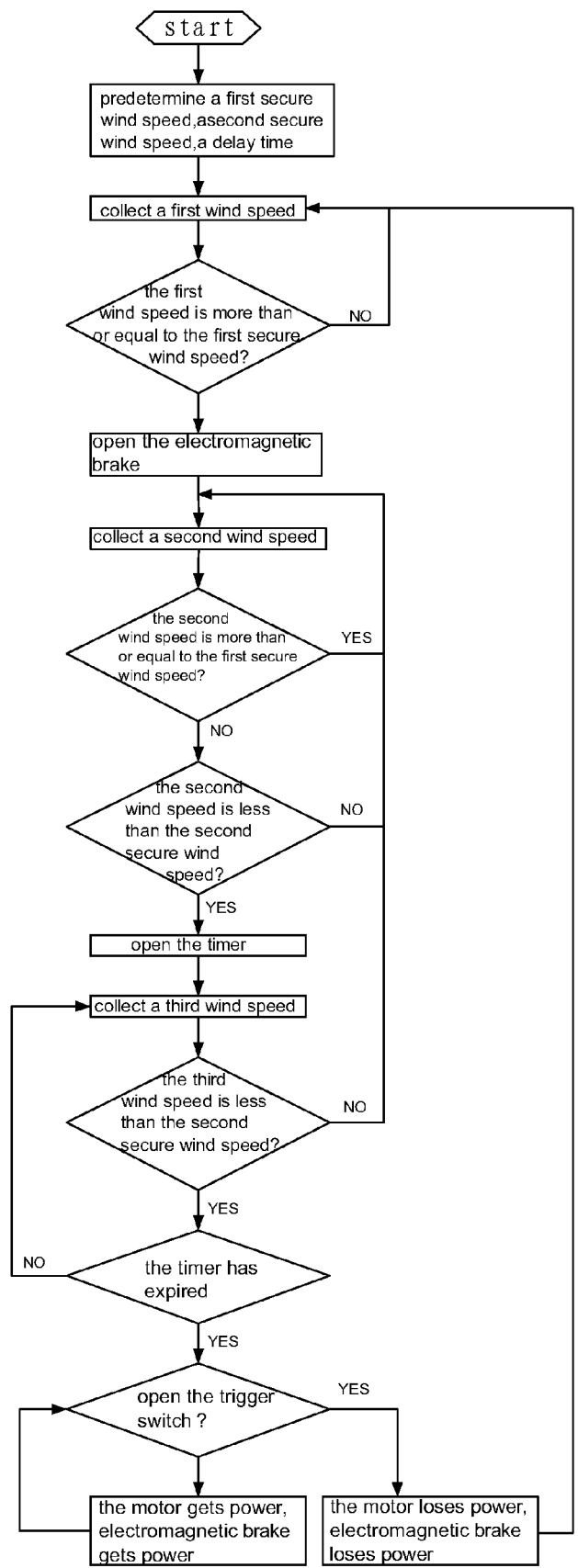
FIG. 7 is a flow chart of the control method according to the first preferred embodiment of the present invention.

In this embodiment, as shown in FIG. 7, a control method of the stormproof billboard comprises the following steps of:

(11) predetermining a first secure wind speed, a second secure wind speed which is less than the first secure wind speed, and a delay time;

(12) the electric control assembly begins to collect a first wind speed measured by the anemoscope 6;

(13) judging whether the first wind speed is greater than or equal to the first secure wind speed, if not, returning to the step (12); if yes, the electric control assembly send a control signal to turn on the electromagnetic brake 3, such that the electromagnetic brake 3 gets power and releases the rotating table 21 so as to make the billboard stent 2 rotate with the natural wind, then entering the next step;

(14) the electric control assembly begins to collect a second wind speed measured by the anemoscope 6;

(15) judging whether the second wind speed is greater than or equal to the first secure wind speed, if yes, returning to the step (14); if not, entering the next step;

(16) judging whether the second wind speed is less than the second secure wind speed, if not, returning to the step (14); if yes, turning on an inner timer which has been predetermined with the delay time, then entering the next step;

(17) the electric control assembly begins to collect a third wind speed measured by the anemoscope 6;

(18) judging whether the third wind speed is less than the second secure wind speed, if not, returning to the step (14); if yes, judging whether the timer has expired, if not, returning to the step (17), if yes, entering the next step; and

(19) judging whether the electric control assembly has received the control signal from the trigger switch, wherein the trigger switch will send the control signal to the electric control assembly when the rotating table 21 has aligned with the pedestal 11, if not, the electric control assembly continues sending the control signal to turn on the electromagnetic brake 3 and the motor 4, such that the electromagnetic brake 3 continues to release the rotating table 21 so as to make the billboard stent 2 reset by the drive of the motor 4; if yes, the electric control assembly sends the control signal to make the electromagnetic brake 3 and the motor 4 lose power so as to make the electromagnetic brake 3 lock the billboard stent 2, returning to the step (12).

In use, in normal weather, the left and right friction plate 32, 33 lock the braked wheel 31 under the force of the spring 34, namely, the rotating shaft 211 is in a locking condition, at this time, the billboard stent 2 faces to people and is locked in a best condition. In windy weather, in order to avoid damaging the billboard stent 2 under the large force of the wind, if the wind speed measured by the electric control assembly is greater than the first secure wind speed, the electric control assembly makes the electromagnetic brake 3 get power so as to make the billboard stent 2 rotate with the wind and automatically adjust to a secure condition; in the delay time, if the wind speed measured by the electric control assembly is less than the second secure wind speed, the electric control assembly makes the motor 4 get power so as to make the billboard stent 2 reset under the drive of the motor 4, when the billboard stent 2 rotates to a position of the trigger switch, the electric control assembly sends the control signal to make the motor 4 and the electromagnetic brake 3 lose power so as to lock the billboard stent 2, such that the billboard stent 2 faces to a better direction again, namely, the billboard stent 2 faces to the road direction.

In a second preferred embodiment of the present invention, with respect to the first preferred embodiment, the stormproof billboard further comprises a dogvane, the anemoscope 6 and the dogvane are different measure elements, the second preferred embodiment uses an anemoclinograph collecting the wind speed and the wind direction, wherein the anemoclinograph can be based on the ground to monitor the real-time wind speed and direction, and sends a wind speed and direction signal to the electric control assembly, the anemoclinograph also can be mounted on the billboard stent 2, the electric control assembly controls the motor 4 and the electromagnetic brake 3 by the control signal of the trigger switch and the wind speed and direction signal collected by the anemoclinograph.

Figure 8:
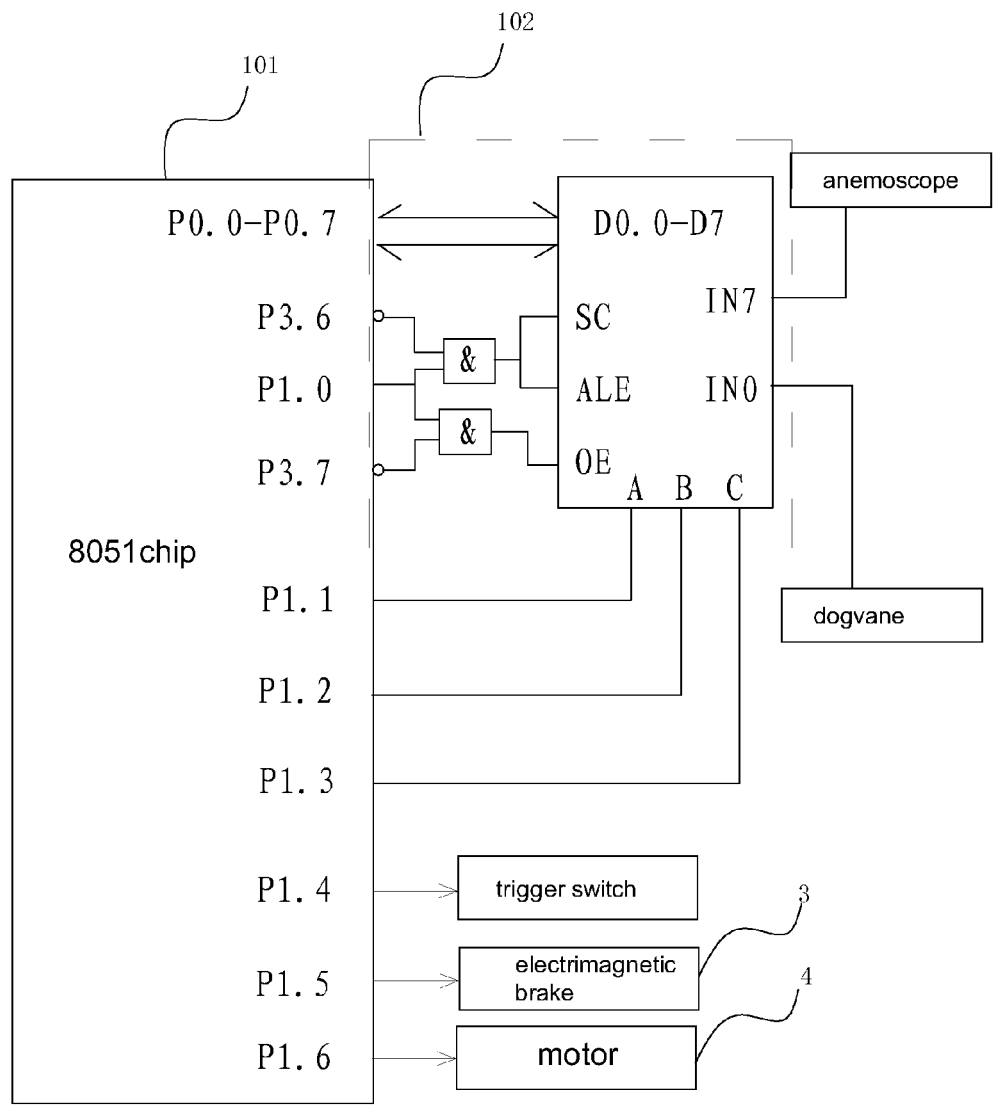
FIG. 8 is a circuit diagram of the electric control assembly according to a second preferred embodiment of the present invention.

The dogvane of the anemoclinograph connects with the first input IN0 pin of the convertor, the anemoscope 6 of the anemoclinograph connects with a second input IN7 pin of the convertor, as shown in FIG. 8.

The control element 101 also is microprocessor chip NO. 8051, the P1.1, P1.2, P1.3 pin of the microprocessor chip respectively connect with the A, B, C pin of the convertor; the P1.4 pin of the microprocessor chip connects with the trigger switch; the P1.5 pin of the microprocessor chip connects with the electromagnet of the electromagnetic brake 3; the P1.6 pin of the microprocessor chip connects with the motor 4.

Figure 9:
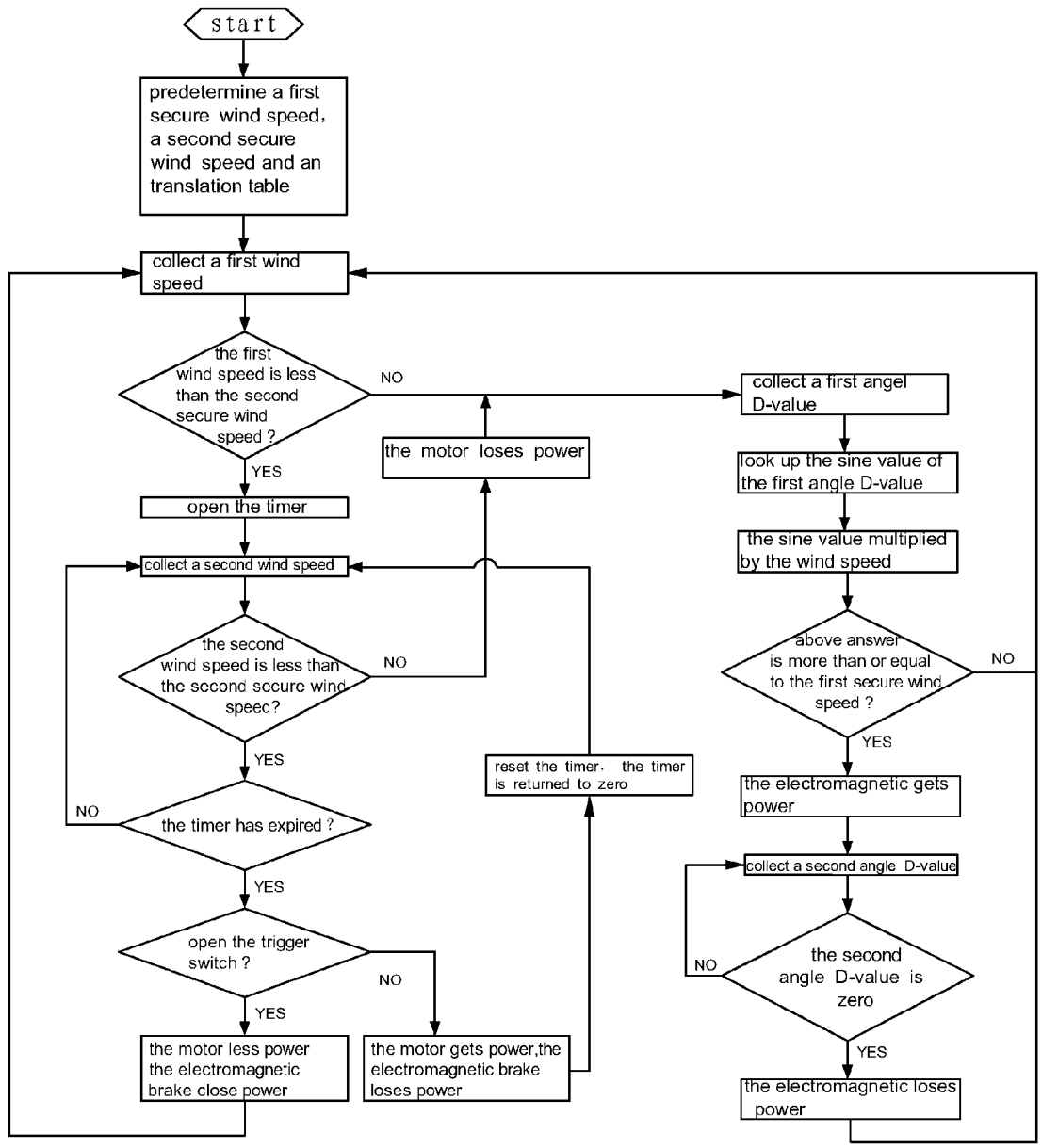
FIG. 9 is a flow chart of the control method according to the second preferred embodiment of the present invention.

In second preferred embodiment, as shown in FIG. 9, a control method of the stormproof billboard comprises the following steps of:

(21) predetermining a first secure wind speed, a second secure wind speed which is less than the first secure wind speed, a delay time, and an angle-sine translation table stored in the electric control assembly;

(22) the electric control assembly begins to collect a first wind speed measured by the anemoscope 6;

(23) judging whether the first wind speed is less than the second secure wind speed, if not, entering the step (26); if yes, turning on an inner timer which has been predetermined with the delay time, then entering the next step;

(24) the electric control assembly begins to collect a second wind speed measured by the anemoscope 6; judging whether the second wind speed is less than the second secure wind speed, if not, the electric control assembly sends the control signal to make the motor 4 lose power, entering the step (26); if yes, judging whether the timer has expired, if not, returning to the step (24), if yes, entering the next step;

(25) judging whether the electric control assembly has received the control signal from the trigger switch, wherein the trigger switch will send the control signal to the electric control assembly when the rotating table 21 has aligned with the pedestal 11, if not, the electric control assembly sends the control signal to turn on the electromagnetic brake 3 and the motor 4, resetting the timer, the timer is returned to zero, and returning to the step (24); if yes, the electric control assembly sends the control signal to make the electromagnetic brake 3 and the motor 4 lose power so as to make the electromagnetic brake 3 lock the rotating table 21, returning to the step (22);

(26) the electric control assembly begins to collect a first angle D-value measured by the dogvane, wherein the first angle D-value is a difference value between the billboard stent 2 direction and the natural wind direction, looking up the sine value of the first angle D-value, the sine value multiplied by the wind speed is a positive wind speed which vertically forces on the billboard stent 2, judging whether the positive wind speed which vertically forces on the billboard stent 2 is greater than or equal to the first secure wind speed; if yes, the electric control assembly sends the control signal to turn on the electromagnetic brake 3, entering the next step; if not, returning to the step (22); and

(27) the electric control assembly begins to collect a second angle D-value measured by the dogvane, wherein the second angle D-value is a difference value between the billboard stent 2 direction and the natural wind direction, judging whether the second angle D-value is zero, if yes, the electric control assembly sends the control signal to turn off the electromagnetic brake 3, then returning to the step (22); if not, returning to the step (27).

Similarly, in use, in normal weather, the left and right friction plate 32, 33 lock the braked wheel 31 under the force of the spring 34, namely, the rotating shaft 211 is in a locking condition, at this time, the billboard stent 2 faces to people and is locked in a best condition. In windy weather, in order to avoid damaging the billboard stent 2 under the large force of the wind, if the sine value of the wind speed measured by the electric control assembly is greater than the first secure wind speed, the electric control assembly makes the electromagnetic brake 3 get power so as to make the billboard stent 2 rotate with the wind, a period of time later, if the angle D-value is zero, this shows that the billboard stent 2 is in a secure condition; in the delay time, if the sine value of the wind speed measured by the electric control assembly is less than the second secure wind speed, the electric control assembly makes the motor 4 get power so as to make the billboard stent 2 reset under the drive of the motor 4, when the billboard stent 2 rotates to the position of the trigger switch, the electric control assembly sends the control signal to make the motor 4 and the electromagnetic brake 3 lose power so as to lock the billboard stent 2, such that the billboard stent 2 faces to a better direction again, namely, the billboard stent 2 faces to the road direction.

Above control method is adapted for eccentric structure, namely, the rotating table 21 is not disposed on the middle of the billboard stent 2, but deviates from the billboard stent 2 in left or right, because this structure makes two sides of the billboard stent 2 uniform, above control method is more reasonable to the eccentric billboard stent 2.

Figure 10:
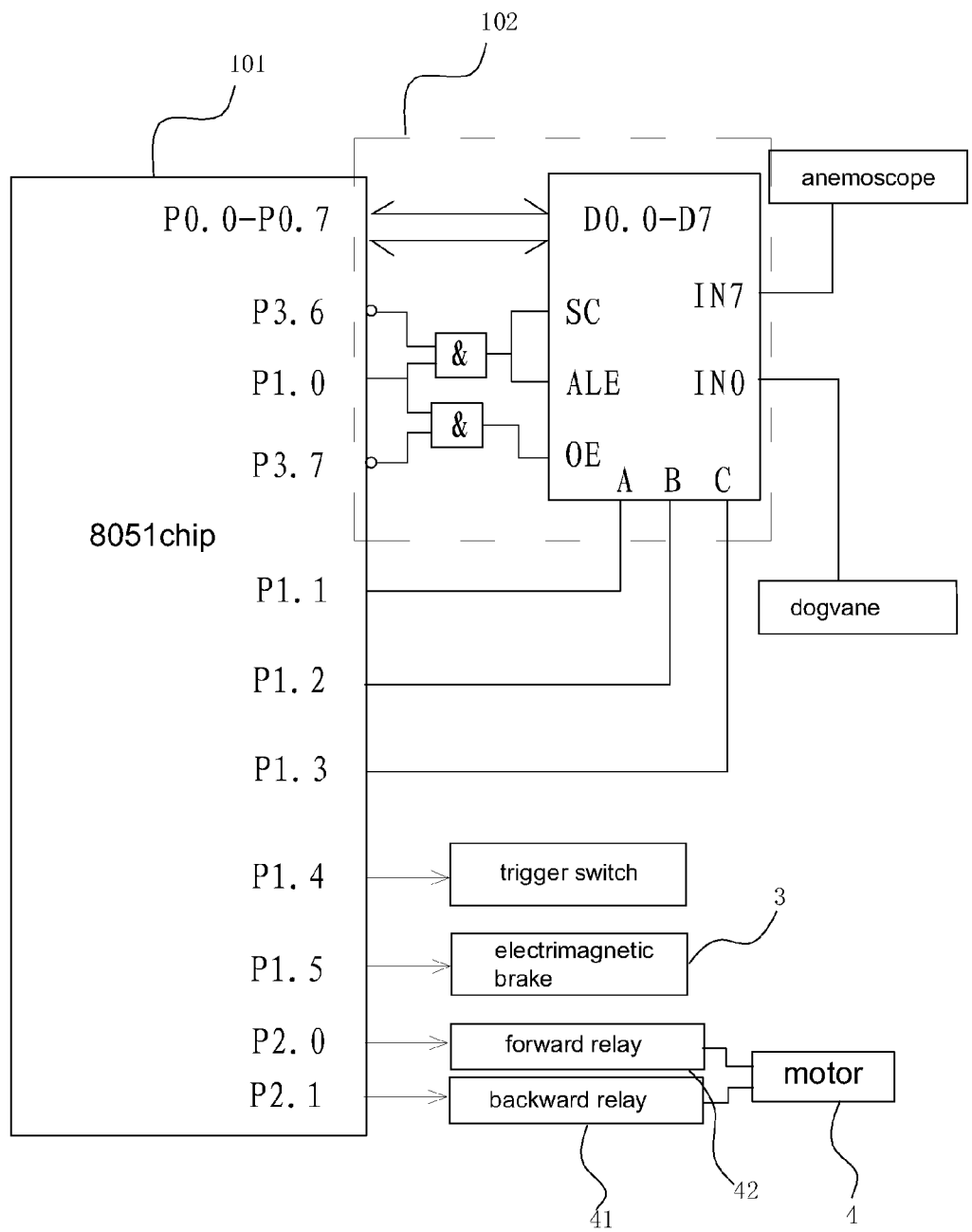
FIG. 10 is a circuit diagram of the electric control assembly according to a third preferred embodiment of the present invention.

In a third preferred embodiment of the present invention, with respect to the second preferred embodiment, the stormproof billboard further comprises a forward relay 42 making the motor 4 to rotate forward and a backward relay 41 making the motor 4 to rotate backward, as shown in FIG. 10.

The P1.5 pin of the microprocessor chip connects with the electromagnet of the electromagnetic brake 3; the P2.0 pin of the microprocessor chip connects with the forward relay 42; the P2.1 pin of the microprocessor chip connects with the backward relay 41; the forward relay 42 and the backward relay 41 respectively connect with the motor 4.

Figure 11:
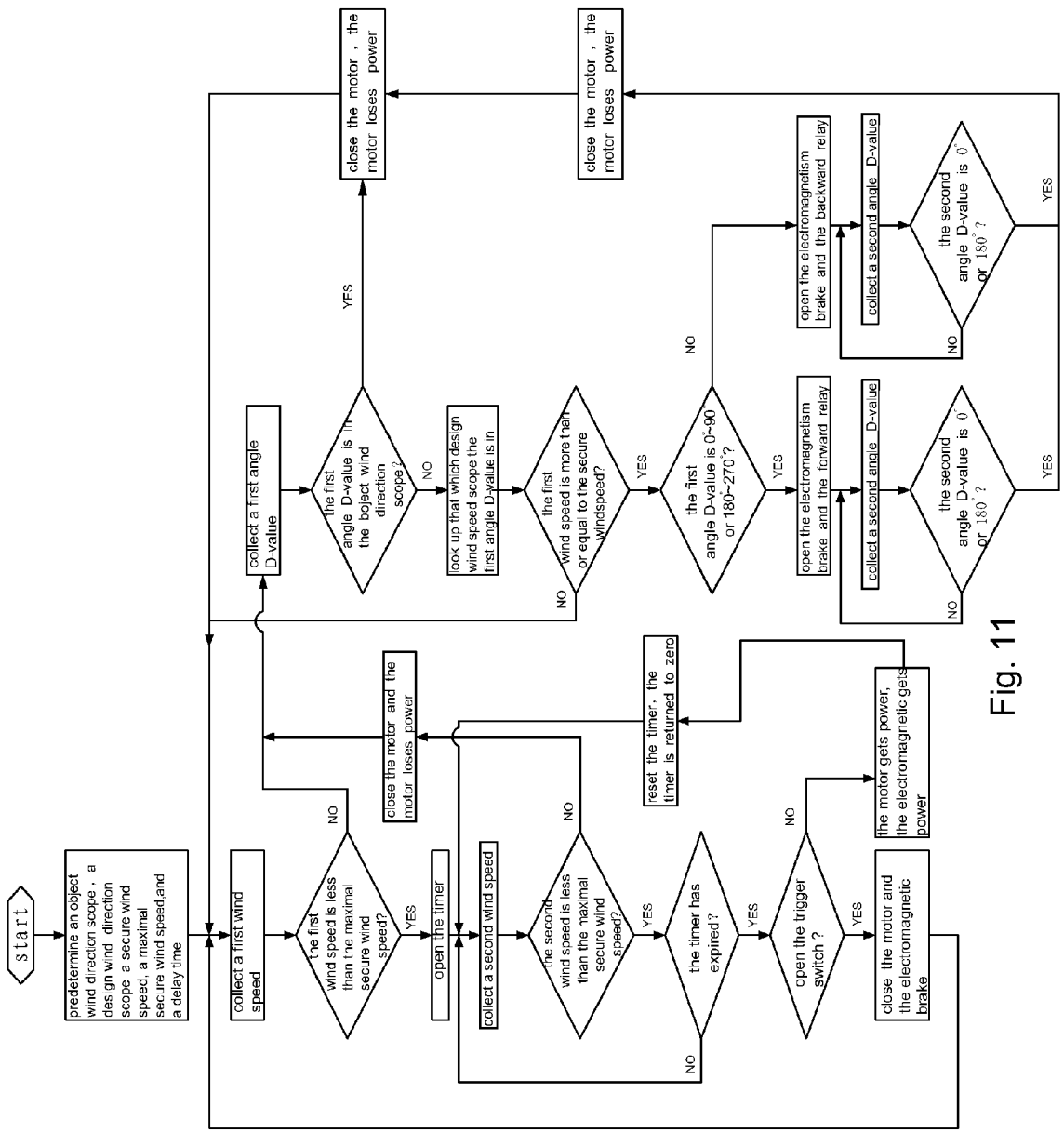
FIG. 11 is a flow chart of the control method according to the third preferred embodiment of the present invention.

In third preferred embodiment, as shown in FIG. 11, a control method of the stormproof billboard comprises the follow steps of:

(31) predetermining an object wind direction scope, a plural continuous design wind direction scope which is greater than the object wind direction scope, a secure wind speed corresponding to each design wind direction scope, a maximal secure wind speed which is less than each secure wind speed, and a delay time;

(32) the electric control assembly begins to collect a first wind speed measured by the anemoscope 6;

(33) judging whether the first wind speed is less than the maximal secure wind speed, if not, entering the step (36); if yes, turning on an timer which has been predetermined with the delay time, then entering the next step;

(34) the electric control assembly begins to collect a second wind speed measured by the anemoscope 6; judging whether the second wind speed is less than the maximal secure wind speed, if not, the electric control assembly sends the control signal to make the motor 4 lose power, entering the step (36); if yes, judging whether the timer has expired, if not, returning to the step (34), if yes, entering the next step;

(35) judging whether the trigger switch is open, namely, the electric control assembly has received the control signal from the trigger switch, wherein the trigger switch will send the control signal to the electric control assembly when the rotating table 21 has aligned with the pedestal 11, if not, the electric control assembly sends the control signal to turn on the electromagnetic brake 3, the forward relay 42 and the backward relay 41, such that the electromagnetic brake 3 gets power and releases the rotating table 21 so as to make the billboard stent 2 reset under the drive of the motor 4, resetting the timer, the timer is returned to zero, and returning to the step (34); if yes, the electric control assembly sends the control signal to make the electromagnetic brake 3 and the motor 4 lose power, returning to the step (32);

(36) the electric control assembly begins to collect a first angle D-value, comparing the first angle D-value with the object wind direction scope, if the first angle D-value is in the object wind direction scope, the electric control assembly sends the control signal to turn off the electromagnetic brake 3, such that the electromagnetic brake 3 loses power to lock the rotating table 21, and returning to the step (32); and

(37) if the first angle D-value is in the design wind direction scope, the first wind speed is greater than or equal to the secure wind speed corresponding to the design wind direction scope, and the first angle D-value is in 0°~90° or 180°~270°, the electric control assembly sends the control signal to turn on the electromagnetic brake 3, such that electromagnetic brake 3 gets power and releases the rotating table 21, and the electric control assembly sends the control signal to turn on the forward relay 42, such that the billboard stent 2 rotates along the natural wind direction by the drive of the motor 4, the electric control assembly goes on collecting a second angle D-value until the second angle D-value is 0° or 180°, the motor 4 and the electromagnetic brake 3 are turned off, returning to the step (32); if the first wind speed is greater than or equal to the secure wind speed corresponding to the design wind direction scope, and the first angle D-value is in 90°~180° or 270°~360°, the electric control assembly sends the control signal to turn on the electromagnetic brake 3, such that the electromagnetic brake 3 gets power and releases the rotating table 21, and the electric control assembly sends the control signal to turn on the backward relay 41, such that the billboard stent 2 also rotates along the natural wind direction by the drive of the motor 4, the electric control assembly goes on collecting a second angle D-value until the second angle D-value is 0° or 180°, the motor 4 and the electromagnetic brake 3 are turned off, returning to the step (32).

When the billboard stent 2 is in the best condition, the object wind direction scope is 337.5°~360°, 0°~22.5° or 157.5°~202.5°, at this time, the billboard stent 2 is almost in parallel with the wind direction.

Here, the design wind direction scope is plural, this embodiment has six:

the wind direction scope of A is 22.5°-67.5°, the wind speed should not exceed II (28 m/s);

the wind direction scope of B is 67.5°-112.5°, the wind speed should not exceed I (21 m/s);

the wind direction scope of C 112.5°-157.5°, the wind speed should not exceed II (28 m/s);

the wind direction scope of D 202.5°-247.5°, the wind speed should not exceed II (28 m/s);

the wind direction scope of E 247.5°-292.5°, the wind speed should not exceed I (21 m/s);

the wind direction scope of F 292.5°-337.5°, wind speed should not exceed II (28 m/s).

Similarly, in use, in normal weather, the left and right friction plate 32, 33 lock the braked wheel 31, at this time, the billboard stent 2 faces to people and is locked in a best condition. In windy weather, if the electric control assembly detects that the angle D-value is in the predetermined object wind direction scope, the direction of the billboard stent 2 is almost in parallel with the natural wind direction, the billboard stent 2 suffers little force, at this time, the billboard stent 2 does not rotate; if the electric control assembly detects that the angle D-value is in the design wind direction scope, and the wind speed is greater than the secure wind speed corresponding to the design wind direction scope, the electric control assembly makes the electromagnet of the electromagnetic brake 3 get power, such that the billboard stent 2 rotates under the drive of the motor 4, if the electric control assembly detects that the angle D-value is 0° or 180°, this shows that billboard stent 2 is in a more secure condition; in the delay time, if the wind speed measured by the electric control assembly is less than the maximal secure wind speed, the electric control assembly makes the motor 4 get power so as to make the billboard stent 2 reset under the drive of the motor 4, when the billboard stent 2 rotates to the position of the trigger switch, the electric control assembly sends the control signal to make the motor 4 and the electromagnetic brake 3 lose power so as to lock the billboard stent 2, such that the billboard stent 2 faces to a better direction again, namely, the billboard stent 2 faces to the road direction.

Above control method is adapted for symmetrical structure, namely, the rotating table 21 is disposed on the middle of the billboard stent 2.

Figure 12:
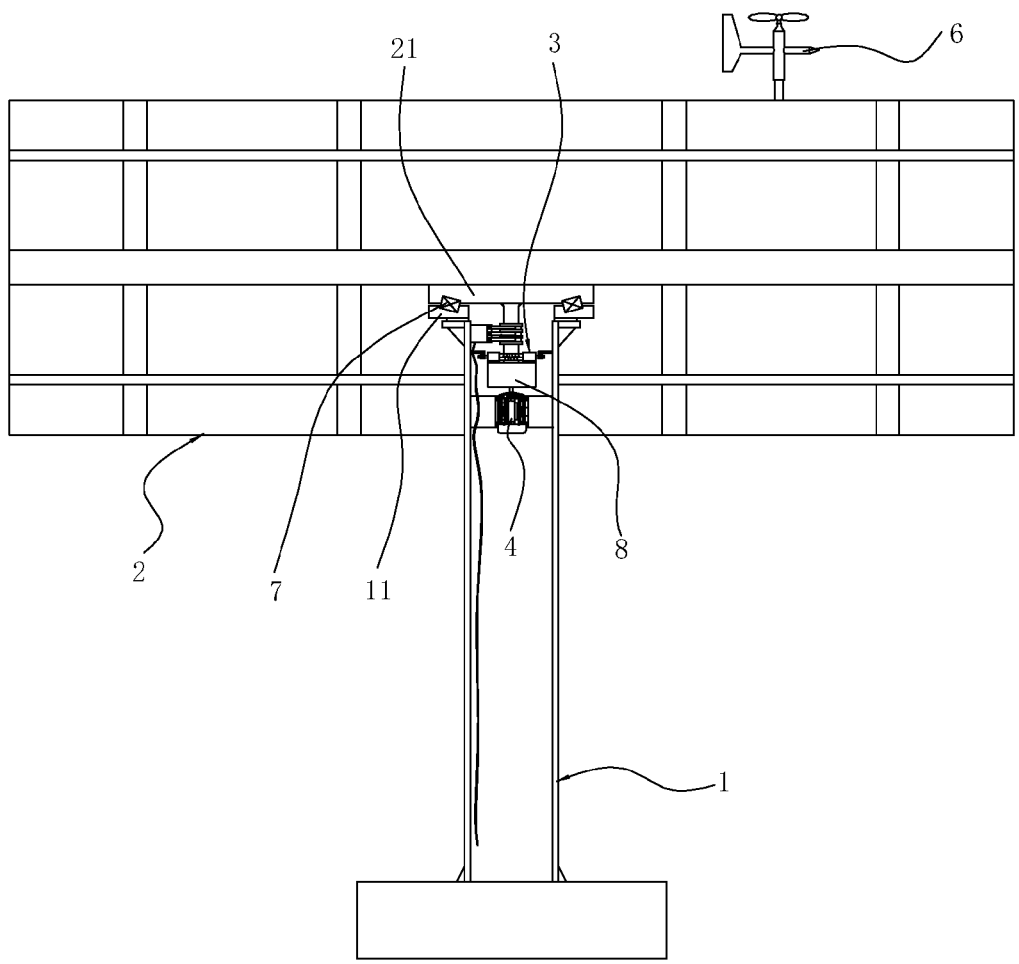
FIG. 12 is a structural schematic view of the stormproof billboard according to a fourth preferred embodiment of the present invention.

In a fourth preferred embodiment of the present invention, as shown in FIG. 12, as comparing to the first, second and third preferred embodiment, the motor 4 and the speed reducer 8 are also fixed on the inside wall of the column 1, the output shaft of the motor 4 links with the rotating shaft 211 by the speed reducer 8 and a joint slack. Clearly, according to such an embodiment, the motor 4 also can drive the billboard stent 2 to rotate, and the structure is more compact and avoids exposing the motor 4 and the speed reducer 8 to sun and rain.

Figure 13:
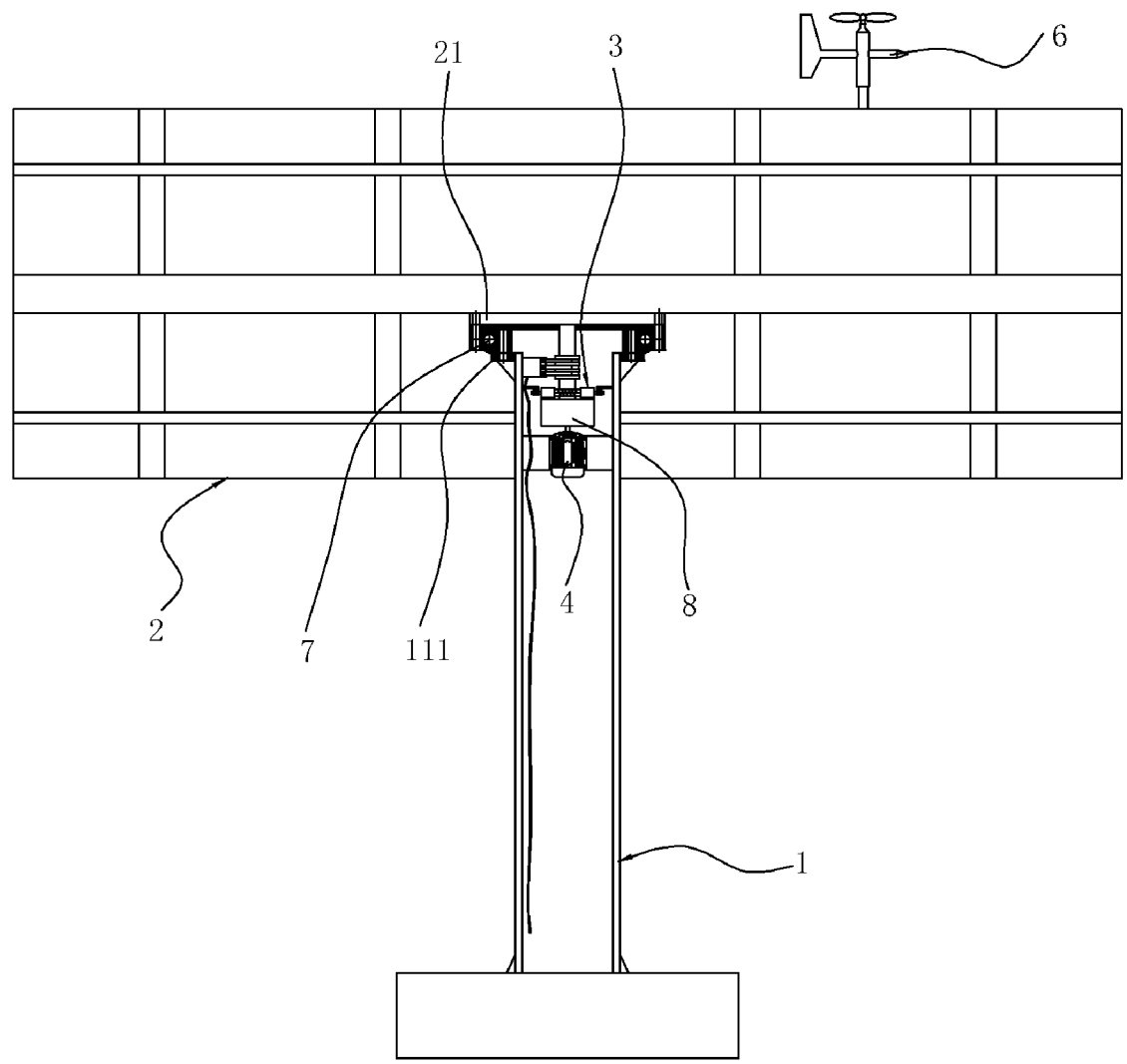
FIG. 13 is a structural schematic view of the stormproof billboard according to a fifth preferred embodiment of the present invention.
Figure 14:
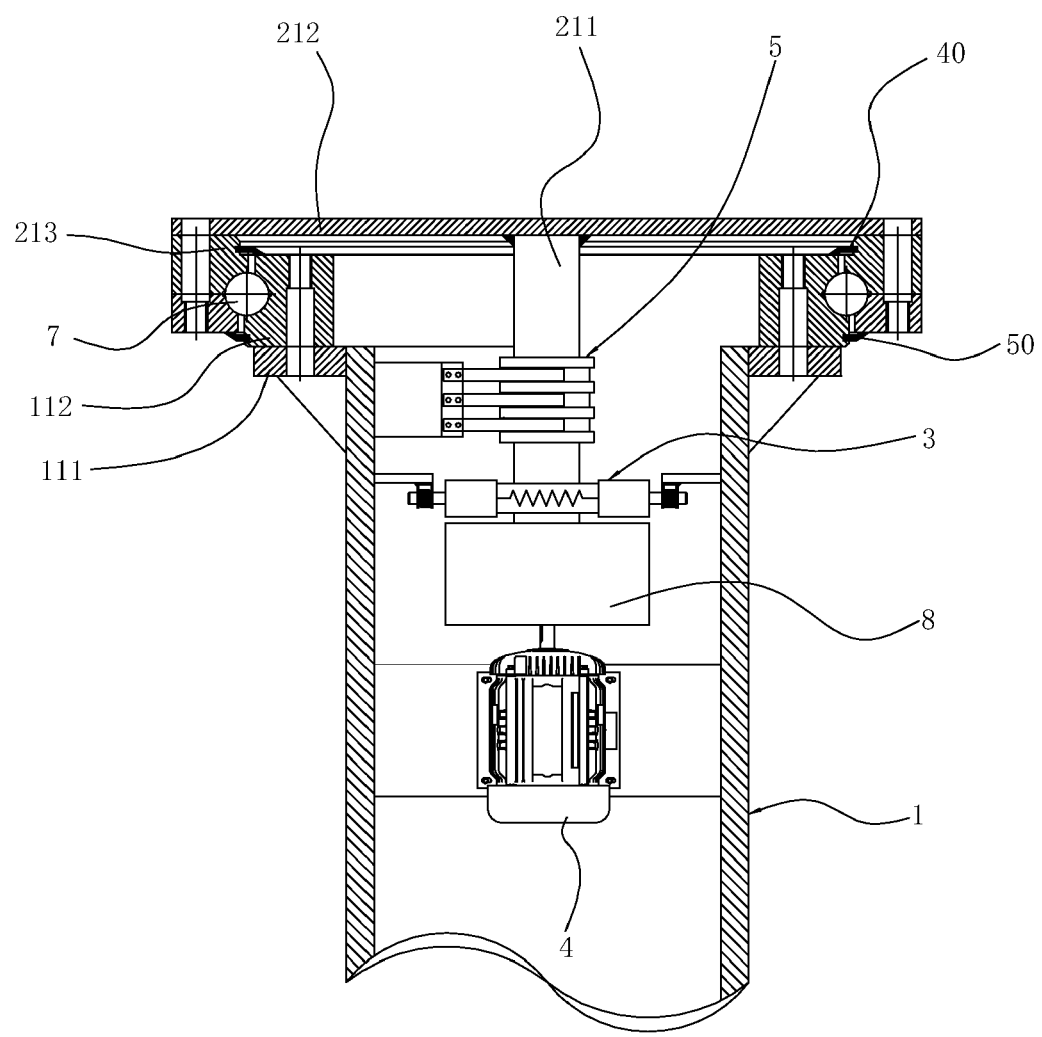
FIG. 14 is an enlarged schematic view of the stormproof billboard without the billboard stent, the motor and the driver gear, according to FIG. 13.

In a fifth preferred embodiment of the present invention, as shown in FIG. 13 and FIG. 14, as comparing to the above four preferred embodiment, the rotating table 21 is designed to a drum-shaped structure, namely, a rotating plate 212 connecting with the rotating shaft 211 aligns with an outer ring 213 fixed on the lower surface of the rotating plate 212 to form a ∩-shaped structure, the pedestal 11 comprises a lower bottom 111 and an inner ring 112 corresponding to the outer ring 213, wherein the inner ring 112 fixed on the lower bottom 111 by bolt, the rotating element 7 is disposed between an inside wall of the outer ring 213 and an outside wall of the inner ring 112. In order to prevent the rotating element 7 contacting with dust and prevent the lubricant grease of the rotating element 7 leaking, an upper sealing element 40 is disposed between the inside wall of the outer ring 213 and the side surface of the pedestal 11, an lower sealing element 50 is disposed between the inside wall of the outer ring 213 and an side surface of the pedestal 11, wherein the upper sealing element 40 is upper than the rotating element 7, the lower sealing element 50 is lower than the rotating element 7, this embodiment is more useful to the rotation of the rotating table 21.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stormproof billboard, comprising:
    a column, wherein a pedestal is disposed on a top of said column;
    a billboard frame, wherein a rotating table is fixed on said billboard frame and corresponding to said pedestal;
    a rotating element disposed between said rotating table and said pedestal so as to make said rotating table rotate with respect to said pedestal;
    a motor disposed on said column, wherein a driver gear is driven by said motor to rotate said rotating table;
    an electromagnetic brake disposed on said column to lock said rotating table;
    an anemometer for measuring a wind speed;
    a trigger switch disposed between said rotating table and said pedestal to measure that whether said rotating table aligns with said pedestal;
    an electric control assembly respectively connecting with said electromagnetic brake, said motor, said anemometer and said trigger switch, wherein said electric control assembly controls working of said motor and said electromagnetic brake by a signal of said trigger switch and a wind speed signal measured by said anemometer; and
    a dogvane, wherein said dogvane connects with said electric control assembly to measure an angle D-value, and the angle D-value is a difference value between a billboard frame direction and a natural wind direction.

2. The stormproof billboard, as recited in claim 1, wherein said trigger switch consists of a block and a limit switch, wherein said limit switch connects with said electric control assembly, said block is fixed on one of said rotating table and said pedestal, while said limit switch is fixed on the other of said rotating table and said pedestal.

3. The stormproof billboard, as recited in claim 1, wherein said electric control assembly comprises a control element and a signal conversion element, wherein said control element respectively connects with said electromagnetic brake, said motor and said trigger switch, said control element respectively connects with said anemometer and said dogvane by said signal conversion element.

4. The stormproof billboard, as recited in claim 3, further comprising a forward relay making said motor rotate forward and a backward relay making said motor rotate backward.

5. A control method of said stormproof billboard recited in claim 4, comprising the steps of:
    (31) predetermining an object wind direction scope, a plural continuous design wind direction scope which is greater than the object wind direction scope, a secure wind speed corresponding to each design wind direction scope, a maximal secure wind speed which is less than each secure wind speed, and a delay time;
    (32) beginning to collect a first wind speed measured by said anemometer with said electric control assembly;
    (33) judging whether the first wind speed is less than the maximal secure wind speed, if not, entering the step (36); if yes, turning on an timer which has been predetermined with the delay time, then entering the next step;

(34) beginning to collect a second wind speed measured by said anemometer with said electric control assembly; judging whether the second wind speed is less than the maximal secure wind speed, if not, said electric control assembly sends the control signal to make said motor lose power, entering the step (36); if yes, judging whether the timer has expired, if not, returning to the step (34), if yes, entering the next step;

(35) judging whether said trigger switch is open, namely, wherein said electric control assembly has received the control signal from said trigger switch, wherein said trigger switch sends the control signal to said electric control assembly when said rotating table has aligned with said pedestal, if not, said electric control assembly sends the control signal to turn on said electromagnetic brake, said forward relay and said backward relay, such that said electromagnetic brake gets power and releases said rotating table so as to make said billboard frame reset under the drive of said motor, resetting the timer, the timer is returned to zero, and returning to the step (34); if yes, said electric control assembly sends the control signal to make said electromagnetic brake and said motor lose power, returning to the step (32);

(36) beginning to collect a first angle D-value with said electric control assembly, comparing the first angle D-value with the object wind direction scope, if the first angle D-value is in the object wind direction scope, said electric control assembly sends the control signal to turn off said electromagnetic brake, such that said electromagnetic brake loses power to lock said rotating table, and returning to the step (32); and

(37) if the first angle D-value is in the design wind direction scope, the first wind speed is greater than or equal to the secure wind speed corresponding to the design wind direction scope, and the first angle D-value is in 0°~90° or 180°~270°, sending the control signal to turn on said electromagnetic brake with said electric control assembly, such that said electromagnetic brake gets power and releases said rotating table, and said electric control assembly sends the control signal to turn on said forward relay, such that said billboard frame rotates along the natural wind direction by the drive of said motor, said electric control assembly goes on collecting a second angle D-value until the second angle D-value is 0° or 180°, said motor and said electromagnetic brake are turned off, returning to the step (32); if the first wind speed is greater than or equal to the secure wind speed corresponding to the design wind direction scope, and the first angle D-value is in 90°~180° or 270°~360°, sending the control signal to turn on said electromagnetic brake with said electric control assembly, such that said electromagnetic brake gets power and releases said rotating table, and said electric control assembly sends the control signal to turn on said backward relay, such that said billboard frame also rotates along the natural wind direction by the drive of said motor, said electric control assembly goes on collecting a second angle D-value until the second angle D-value is 0° or 180°, said motor and said electromagnetic brake are turned off, returning to the step (32).

6. A control method of said stormproof billboard recited in claim 1, comprising the steps of:

(21) predetermining a first secure wind speed, a second secure wind speed which is less than the first secure wind speed, a delay time, and an angle-sine translation table stored in said electric control assembly;

(22) beginning to collect a first wind speed measured by said anemometer with said electric control assembly;

(23) judging whether said first wind speed is less than the second secure wind speed, if not, entering the step (26); if yes, turning on an inner timer which has been predetermined with the delay time, then entering the next step;

(24) beginning to collect a second wind speed measured by said anemometer with said electric control assembly; judging whether the second wind speed is less than the second secure wind speed, if not, said electric control assembly sends the control signal to make said motor lose power, entering the step (26); if yes, judging whether the timer has expired, if not, returning to the step (24), if yes, entering the next step;

(25) judging whether said electric control assembly has received the control signal from said trigger switch, wherein said trigger switch sends the control signal to said electric control assembly when said rotating table has aligned with said pedestal, if not, said electric control assembly sends the control signal to turn on said electromagnetic brake and said motor, resetting the timer, the timer is returned to zero, and returning to the step (24); if yes, said electric control assembly sends the control signal to make said electromagnetic brake and said motor lose power so as to make said electromagnetic brake lock said rotating table, returning to the step (22);

(26) beginning to collecting a first angle D-value measured by said dogvane with said electric control assembly, wherein the first angle D-value is a difference value between the billboard direction and the natural wind direction, looking up the sine value of the first angle D-value, the sine value multiplied by the wind speed is a positive wind speed which vertically forces on said billboard frame, judging whether the positive wind speed which vertically forces on said billboard frame is greater than or equal to the first secure wind speed; if yes, said electric control assembly sends the control signal to turn on said electromagnetic brake, entering the next step; if not, returning to the step (22); and

(27) beginning to collecting a second angle D-value measured by said dogvane with said electric control assembly, wherein the second angle D-value is a difference value between the billboard direction and the natural wind direction, judging whether the second angle D-value is zero, if yes, said electric control assembly sends the control signal to turn off said electromagnetic brake, then returning to the step (22); if not, returning to the step (27).

7. A stormproof billboard, comprising:

a column, wherein a pedestal is disposed on a top of said column;

a billboard frame, wherein a rotating table is fixed on said billboard frame and corresponding to said pedestal;

a rotating element disposed between said rotating table and said pedestal so as to make said rotating table rotate with respect to said pedestal;

a motor disposed on said column, wherein a driver gear is driven by said motor to rotate said rotating table;

an electromagnetic brake disposed on said column to lock said rotating table;

an anemometer for measuring a wind speed;

a trigger switch disposed between said rotating table and said pedestal to measure that whether said rotating table aligns with said pedestal; and an electric control assembly respectively connecting with said electromagnetic brake, said motor, said anemometer and said trigger switch, wherein said electric control assembly controls working of said motor and said electromagnetic brake by a signal of said trigger switch and a wind speed signal measured by said anemometer; wherein a rotating shaft downwards inserting into said column is disposed on said rotating table, said electromagnetic brake is disposed in said column, said electromagnetic brake comprises a braked wheel ringing on said rotating shaft, a left friction plate disposed on a left side of said braked wheel, and a right friction plate disposed on a right side of said braked wheel, wherein one end of each of said left friction plate and said right friction plate is fixed on an inside wall of said column respectively, another end of each of said left friction plate and said right friction plate is free, and two electromagnetic power units are respectively disposed on said free ends of said left friction plate and said right friction plate.

8. The stormproof billboard, as recited in claim 7, wherein a center current collector is disposed in said column, said center current collector comprises at least an electric elastic clip, and a collecting ring fixed on said rotating shaft, wherein two carbon brushes are respectively fixed on two relative ends of said elastic clips, a plurality of electric annular grooves are spacedly formed on said collecting ring and are mutually insulating, each electric annular groove of said collecting ring is clipped by said corresponding elastic clip to make said carbon brushes cling to an outside surface of said electric annular groove.

9. The stormproof billboard, as recited in claim 8, wherein said electric control assembly comprises a control element and a signal conversion element, wherein said control element respectively connects with said electromagnetic brake, said motor and said trigger switch, said control element respectively connects with said anemometer and said dogvane by said signal conversion element.

10. The stormproof billboard, as recited in claim 9, further comprising a forward relay making said motor rotate forward and a backward relay making said motor rotate backward.

11. A control method of said stormproof billboard recited in claim 10, comprising the steps of:
(31) predetermining an object wind direction scope, a plural continuous design wind direction scope which is greater than the object wind direction scope, a secure wind speed corresponding to each design wind direction scope, a maximal secure wind speed which is less than each secure wind speed, and a delay time;
(32) beginning to collect a first wind speed measured by said anemometer with said electric control assembly;
(33) judging whether the first wind speed is less than the maximal secure wind speed, if not, entering the step (36); if yes, turning on an timer which has been predetermined with the delay time, then entering the next step;
(34) beginning to collect a second wind speed measured by said anemometer with said electric control assembly; judging whether the second wind speed is less than the maximal secure wind speed, if not, said electric control assembly sends the control signal to make said motor lose power, entering the step (36); if yes, judging whether the timer has expired, if not, returning to the step (34), if yes, entering the next step;
(35) judging whether said trigger switch is open, namely, wherein said electric control assembly has received the control signal from said trigger switch, wherein said trigger switch sends the control signal to said electric control assembly when said rotating table has aligned with said pedestal, if not, said electric control assembly sends the control signal to turn on said electromagnetic brake, said forward relay and said backward relay, such that said electromagnetic brake gets power and releases said rotating table so as to make said billboard frame reset under the drive of said motor, resetting the timer, the timer is returned to zero, and returning to the step (34); if yes, said electric control assembly sends the control signal to make said electromagnetic brake and said motor lose power, returning to the step (32);
(36) beginning to collect a first angle D-value with said electric control assembly, comparing the first angle D-value with the object wind direction scope, if the first angle D-value is in the object wind direction scope, said electric control assembly sends the control signal to turn off said electromagnetic brake, such that said electromagnetic brake loses power to lock said rotating table, and returning to the step (32); and
(37) if the first angle D-value is in the design wind direction scope, the first wind speed is greater than or equal to the secure wind speed corresponding to the design wind direction scope, and the first angle D-value is in 0°~90° or 180°~270°, sending the control signal to turn on said electromagnetic brake with said electric control assembly, such that said electromagnetic brake gets power and releases said rotating table, and said electric control assembly sends the control signal to turn on said forward relay, such that said billboard frame rotates along the natural wind direction by the drive of said motor, said electric control assembly goes on collecting a second angle D-value until the second angle D-value is 0° or 180°, said motor and said electromagnetic brake are turned off, returning to the step (32); if the first wind speed is greater than or equal to the secure wind speed corresponding to the design wind direction scope, and the first angle D-value is in 90°~180° or 270°~360°, sending the control signal to turn on said electromagnetic brake with said electric control assembly, such that said electromagnetic brake gets power and releases said rotating table, and said electric control assembly sends the control signal to turn on said backward relay, such that said billboard frame also rotates along the natural wind direction by the drive of said motor, said electric control assembly goes on collecting a second angle D-value until the second angle D-value is 0° or 180°, said motor and said electromagnetic brake are turned off, returning to the step (32).

12. The stormproof billboard, as recited in claim 8, wherein said trigger switch consists of a block and a limit switch, wherein said limit switch connects with said electric control assembly, said block is fixed on one of said rotating table and said pedestal, while said limit switch is fixed on the other of said rotating table and said pedestal.

13. The stormproof billboard, as recited in claim 7, wherein said trigger switch consists of a block and a limit switch, wherein said limit switch connects with said electric control assembly, said block is fixed on one of said rotating table and said pedestal, while said limit switch is fixed on the other of said rotating table and said pedestal.

14. The stormproof billboard, as recited in claim 7, wherein said electric control assembly comprises a control element and a signal conversion element, wherein said control element respectively connects with said electromagnetic brake, said motor and said trigger switch, said control element respectively connects with said anemometer and said dogvane by said signal conversion element.

15. The stormproof billboard, as recited in claim 14, further comprising a forward relay making said motor rotate forward and a backward relay making said motor rotate backward.

16. A control method of said stormproof billboard recited in claim 15, comprising the steps of:
- (31) predetermining an object wind direction scope, a plural continuous design wind direction scope which is greater than the object wind direction scope, a secure wind speed corresponding to each design wind direction scope, a maximal secure wind speed which is less than each secure wind speed, and a delay time;
- (32) beginning to collect a first wind speed measured by said anemometer with said electric control assembly;
- (33) judging whether the first wind speed is less than the maximal secure wind speed, if not, entering the step (36); if yes, turning on an timer which has been predetermined with the delay time, then entering the next step;
- (34) beginning to collect a second wind speed measured by said anemometer with said electric control assembly; judging whether the second wind speed is less than the maximal secure wind speed, if not, said electric control assembly sends the control signal to make said motor lose power, entering the step (36); if yes, judging whether the timer has expired, if not, returning to the step (34), if yes, entering the next step;
- (35) judging whether said trigger switch is open, namely, wherein said electric control assembly has received the control signal from said trigger switch, wherein said trigger switch sends the control signal to said electric control assembly when said rotating table has aligned with said pedestal, if not, said electric control assembly sends the control signal to turn on said electromagnetic brake, said forward relay and said backward relay, such that said electromagnetic brake gets power and releases said rotating table so as to make said billboard frame reset under the drive of said motor, resetting the timer, the timer is returned to zero, and returning to the step (34); if yes, said electric control assembly sends the control signal to make said electromagnetic brake and said motor lose power, returning to the step (32);
- (36) beginning to collect a first angle D-value with said electric control assembly, comparing the first angle D-value with the object wind direction scope, if the first angle D-value is in the object wind direction scope, said electric control assembly sends the control signal to turn off said electromagnetic brake, such that said electromagnetic brake loses power to lock said rotating table, and returning to the step (32); and
- (37) if the first angle D-value is in the design wind direction scope, the first wind speed is greater than or equal to the secure wind speed corresponding to the design wind direction scope, and the first angle D-value is in 0°~90° or 180°~270°, sending the control signal to turn on said electromagnetic brake with said electric control assembly, such that said electromagnetic brake gets power and releases said rotating table, and said electric control assembly sends the control signal to turn on said forward relay, such that said billboard frame rotates along the natural wind direction by the drive of said motor, said electric control assembly goes on collecting a second angle D-value until the second angle D-value is 0° or 180°, said motor and said electromagnetic brake are turned off, returning to the step (32); if the first wind speed is greater than or equal to the secure wind speed corresponding to the design wind direction scope, and the first angle D-value is in 90°~180° or 270°~360°, sending the control signal to turn on said electromagnetic brake with said electric control assembly, such that said electromagnetic brake gets power and releases said rotating table, and said electric control assembly sends the control signal to turn on said backward relay, such that said billboard frame also rotates along the natural wind direction by the drive of said motor, said electric control assembly goes on collecting a second angle D-value until the second angle D-value is 0° or 180°, said motor and said electromagnetic brake are turned off, returning to the step (32).

17. A stormproof billboard, comprising:
- a column, wherein a pedestal is disposed on a top of said column;
- a billboard frame, wherein a rotating table is fixed on said billboard frame and corresponding to said pedestal;
- a rotating element disposed between said rotating table and said pedestal so as to make said rotating table rotate with respect to said pedestal;
- a motor disposed on said column, wherein a driver gear is driven by said motor to rotate said rotating table;
- an electromagnetic brake disposed on said column to lock said rotating table;
- an anemometer for measuring a wind speed;
- a trigger switch disposed between said rotating table and said pedestal to measure that whether said rotating table aligns with said pedestal; and
- an electric control assembly respectively connecting with said electromagnetic brake, said motor, said anemometer and said trigger switch, wherein said electric control assembly controls working of said motor and said electromagnetic brake by a signal of said bidder switch and a wind speed signal measured by said anemometer,
- wherein said trigger switch consists of a block and a limit switch, wherein said limit switch connects with said electric control assembly, said block is fixed on one of said rotating table and said pedestal, while said limit switch is fixed on the other of said rotating table and said pedestal.

18. A control method of a stormproof billboard,
wherein said stormproof billboard comprises:
- a column, wherein a pedestal is disposed on a top of said column;
- a billboard frame, wherein a rotating table is fixed on said billboard frame and corresponding to said pedestal;
- a rotating element disposed between said rotating table and said pedestal so as to make said rotating table rotate with respect to said pedestal;
- a motor disposed on said column, wherein a driver gear is driven by said motor to rotate said rotating table;
- an electromagnetic brake disposed on said column to lock said rotating table;
- an anemometer for measuring a wind speed;
- a trigger switch disposed between said rotating table and said pedestal to measure that whether said rotating table aligns with said pedestal; and
- an electric control assembly respectively connecting with said electromagnetic brake, said motor, said anemometer and said trigger switch, wherein said electric control assembly controls working of said motor and said electromagnetic brake by a signal of said trigger switch and a wind speed signal measured by said anemometer, comprising the steps of:
- (11) predetermining a first secure wind speed, a second secure wind speed which is less than the first secure wind speed, and a delay time;
- (12) beginning to collect a first wind speed measured by said anemometer with said electric control assembly;

(13) judging whether the first wind speed is greater than or equal to the first secure wind speed, if not, returning to the step (12); if yes, said electric control assembly sends a control signal to turn on said electromagnetic brake, such that said electromagnetic brake gets power and releases said rotating table so as to make said billboard frame rotate with the natural wind, then entering the next step;

(14) beginning to collect a second wind speed measured by said anemometer with said electric control assembly;

(15) judging whether the second wind speed is greater than or equal to the first secure wind speed, if yes, returning to the step (14); if not, entering the next step;

(16) judging whether the second wind speed is less than the second secure wind speed, if not, returning to the step (14); if yes, turning on an inner timer which has been predetermined with the delay time, then entering the next step;

(17) beginning to collect a third wind speed measured by said anemometer with said electric control assembly;

(18) judging whether the third wind speed is less than the second secure wind speed, if not, returning to the step (14); if yes, judging whether the timer has expired, if not, returning to the step (17), if yes, entering the next step; and

(19) judging whether said electric control assembly has received the control signal from said trigger switch, wherein said trigger switch sends the control signal to said electric control assembly when said rotating table has aligned with said pedestal, if not, said electric control assembly continues sending the control signal to turn on said electromagnetic brake and said motor, such that said electromagnetic brake continues to release said rotating table so as to make said billboard frame reset by the drive of said motor; if yes, said electric control assembly sends the control signal to make said electromagnetic brake and said motor lose power so as to make said electromagnetic brake lock said billboard frame, returning to the step (12).

* * * * *